United States Patent

Peterson

[15] 3,676,597

[45] July 11, 1972

[54] COIN TELEPHONE NON-COIN SERVICE

[72] Inventor: Gerald Henry Peterson, Little Silver, N.J.

[73] Assignee: Bell Telephone Laboratories, Incorporated, Murray Hill, Berkeley Heights, N.J.

[22] Filed: Dec. 28, 1970

[21] Appl. No.: 101,978

[52] U.S. Cl. ..........179/6.3 R

[51] Int. Cl. ..........H04m 17/00

[58] Field of Search..........179/6.3 R, 6.3 CC, 6.3 MA, 179/6.31, 17 C, 90 D

[56] References Cited

UNITED STATES PATENTS 3,601,541 8/1971 Thompson..........179/6.3 R 3,406,256 10/1968 Strommen..........179/6.3 R 2,886,641 5/1959 Lomax..........179/6.3 R

*Primary Examiner*—Kathleen H. Claffy

*Assistant Examiner*—Horst F. Brauner

*Attorney*—R. J. Guenther and James Warren Falk

[57] ABSTRACT

A circuit is disclosed for providing coin-free call service for certain specifiable dial codes and for prohibiting fraudulent calls. The circuit provides an initial dial tone and checks the first three digits dialed without any coins being deposited. If a coin-free code is dialed, the circuit allows the call to be completed. If a coin-free code is not dialed, the circuit performs a coin test and allows the call to be completed, if proper coinage is detected. Otherwise the already established connection through the network is caused to be taken down, and the calling party is connected to a recorded announcement.

11 Claims, 7 Drawing Figures

FIG. 7

INVENTOR
G. H. PETERSON
BY Howard R Popper
ATTORNEY (DIGIT REGISTER)

(COIN CONTROL)

COIN TELEPHONE NON-COIN SERVICE

FIELD OF THE INVENTION

This invention relates to coin telephone systems and more particularly to a system for providing dial-tone-first coin-free telephone service for certain emergency and operator service dial codes.

BACKGROUND OF THE INVENTION

A system that would provide limited coin-free telephone service from telephone pay stations would serve several important purposes. Emergency calls could be completed from a coin station when the calling party does not have the coinage required for the usual minimum deposit. Operator service calls could also be made, as for example, when the calling party desires to place a collect call but did not have the initial dime required to get the operator on the line. The desirability of such service has long been recognized but cost and technical difficulties have heretofore impeded its development and implementation. One problem in providing such coin-free service occurs because most coin telephone systems are designed to withhold all service until the customer deposits coins equal to or exceeding the local initial rate. For example, it is customary to require the user of a coin telephone station served by a step-by-step switching office to make an initial coin deposit because once the station would be allowed access to the switching network there has heretofore been no convenient way of restricting the type of call that could be made. In addition prepay systems of this type are employed because, among other reasons, they are considered to be less susceptible to the variety of fraudulent techniques that might be practiced upon postpay coin telephone systems, they discourage frivolous use of the telephone, and they invariably achieve a higher collection ratio.

Prior art coin-free access systems have either compromised the desired performance or have been comparatively expensive. In one prior art system, for example, the call is allowed to proceed until the called party answers. Then, reverse polarity battery is transmitted back over the connection to the calling pay station causing a polar coin relay in the calling pay station to shunt the transmitter of the calling telephone and prevent conversation until the required fee has been deposited. Provision is also made in this prior art system for an operator to restore the normal battery polarity. This prior art arrangement can of course provide the desired emergency and operator services but is not capable of precluding all other uses of the telephone. For example, a free, "listen-only" call can still be placed to recorded announcement lines.

Another prior art coin telephone system provides coin-free service only when the operator digit is dialed. To accomplish this every pay station is modified by adding an oscillator and additional dial contacts, and a tone receiver is added to every coin trunk. When the operator digit is dialed without the proper coinage deposit, coin ground potential is temporarily applied to the station line, and the oscillator is activated to generate a specific tone. The coin ground potential is removed from the station line when the dial begins to unwind. The tone receiver in the coin trunk detects the temporarily applied tone and allows the coin station to be connected to an operator. However, this coin telephone system only permits coin-free access to the operator. Other operator service requiring a different initial digit from 0, or requiring more than one digit, or emergency calls, are precluded without the initial minimum coinage deposit.

Accordingly, an object of my invention is to provide dial-tone-first and coin-free service for a multiplicity of specific programmable dial codes to coin telephone stations associated with step-by-step or serially progressive type switching systems, while prohibiting fraudulent and frivolous use of the coin telephone stations.

SUMMARY OF THE INVENTION

This and other related objects are achieved in accordance with an illustrative embodiment of my invention by allowing dial tone to be provided before any coins are deposited and by modifying the coin trunk so that it will check the first three digits dialed while simultaneously allowing these digits to operate the switching train of the central office. Circuit logic which I provide in the coin trunk examines the first or first three digits dialed to determine whether a coin-free call code has been dialed. If a coin-free call code is detected, the call is permitted to be completed. If the logic circuit determines that the code is not for a permitted coin-free call, a coin test is made and the call is permitted to be completed only if the proper coinage is deposited. If proper coinage is not deposited, the modified coin trunk causes the existing connection through the switching network to be taken down and the particular coin station to be connected to a recorded announcement indicating the lack of initial coin deposit. Further, I provide coin-free call service, for a number of different predeterminable one- or three-digit dial codes by providing changeable cross-connections to the circuit logic of the coin trunk. According to a significant aspect of my invention, the foregoing service features may be provided without any need to modify the circuitry in the coin telephone station itself.

It is a feature of my invention that a digit register, register the dialed digits and that a decoder circuit check each registered digit, in sequence, to determine if it is a valid digit of a code allowed for a coin-free call.

It is a further feature of my invention that a digit counter count the number of digits dialed and that the decoder circuit is responsive to a predetermined digit in the digit register and a predetermined count of the digit counter to store an indication of a valid digit.

It is still a further feature of my invention that the circuitry that applies the dialed digits to the network of the serially progressive switching system simultaneously cause the operation of the digit register to register the dialed digits.

DESCRIPTION OF THE DRAWING

The above and other objects and features of my invention will become more apparent upon consideration of the following description of one illustrative embodiment thereof in conjunction with the drawing, in which.

Figures 1, 7:
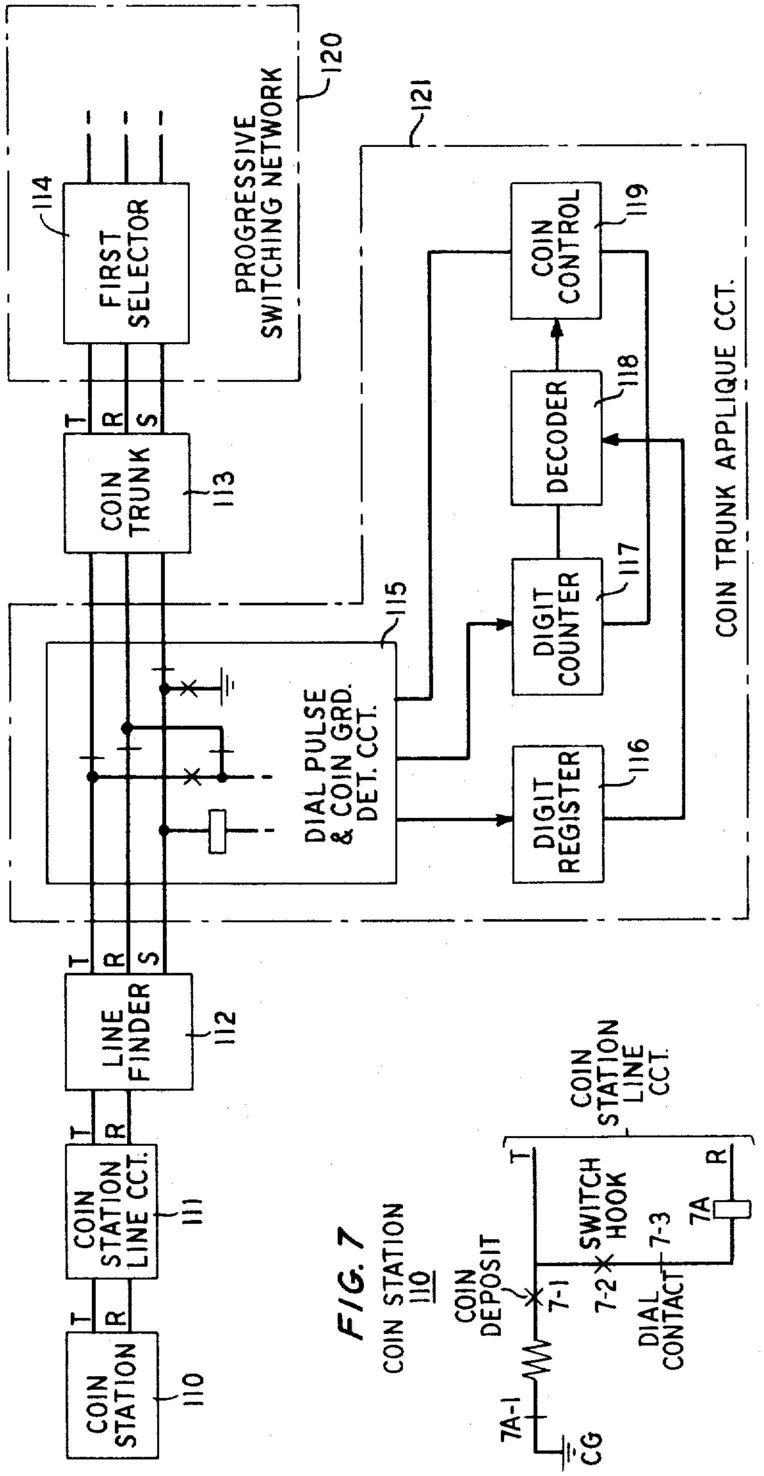
FIG. 1 is a block diagram of the coin circuits of a serially progressive type switching system as modified in accordance with my invention.
FIG. 7 is a partial schematic diagram of a coin telephone.

It will be noted that FIGS. 1 through 5 employ a type of notation referred to as "detached contact" in which an "X" represents a normally open contact of a relay, and in which a bar, shown intersecting a conductor at right angles, represents a normally closed contact of a relay; "normally" referring to the unoperated condition of the relay. The principles of this type of notation are described in an article by F. T. Myer in the publication of the *American Institute of Electrical Engineers Transactions, Communications and Electronics*, entitled "An Improved Detached-Contact-Type Circuit Drawing," Vol. 74, pages 505–513.

GENERAL DESCRIPTION

In the conventional coin-first operation of a telephone system, the off-hook state of a coin station such as station 110 would not be detected by coin-station line circuit 111 until coinage equal to or exceeding the local initial rate is deposited. Deposit of the proper coinage at coin station 110 (FIG. 7) would close coin deposit make contact 7-1 applying coin ground to the T-lead and through switchhook make contact 7-2, dial break contact 7-3, and the winding of relay 7A to the R-lead. Coin station line circuit 111 would detect coin ground on the R-lead as a request for service and would request an idle line finger (112) to be connected to coin station 110.

When using my invention, coin station line circuit 111 would have to be modified to provide loop-start operation instead of the coin ground-start operation just described. Loop-start operation is a conventionally available alternative to ground-start, but is not normally employed on coin service lines. Since service-loop start line circuits are well known, the details thereof have been omitted from the drawing. With loop-start operation, coin station line circuit 111 normally applies ground potential to lead T and negative battery potential to lead R through the line circuit start relay, both towards coin station 110. When a call is initiated at coin station 110, switchhook make contact 7-3 is closed and an operating path for the line circuit start relay (not shown) is completed without any coins being deposited. The path may be traced from negative battery on lead R, the winding of relay 7A, dial contact break contact 7-3, and switchhook make contact 7-2 to ground potential on lead T. Once line finder 112 and coin trunk 113 are connected to coin station line circuit 111, the ground and battery potentials respectively placed on leads T and R by line circuit 111 are removed, and battery and ground potentials are placed on leads T and R from coin trunk 113 and dial pulse circuit 115. In this manner the calling party at coin station 110 need not deposit any coins in order to be connected to switching network 120.

Coin trunk applique circuit 121 and coin trunk 113 are associated with line finder 112 and serve to give coin station 110 access to first selector 114 of the serially progressive switching network 120. Neglecting for a moment coin trunk applique circuit 121, let it be assumed that a connection exists between line finder 112 and first selector 114. Dial tone is returned to coin station 110 from first selector 114 over leads T and R. At the same time coin trunk 113 applies ground potential to the T-lead and a negative potential to the R-lead, both towards coin station 110 (FIG. 7), but not toward first selector 114. In FIG. 7, current flows through the station loop through switchhook make contact 7-2, dial break contact 7-3 and the winding of relay 7A. Relay 7A operates, and, at its break contact 7A-1, removes coin ground (if coinage has been deposited) from the T-lead. As a number is dialed by the party at the coin station (FIG. 7), dial break contact 7-3 momentarily interrupts the current flowing through the station loop over the T- and R-leads for each dial pulse. These current interruptions, indicative of the dialed number, are detected at coin trunk applique circuit 121 and repeated toward progressive type switching network 120. The first dialed digit sets up the connection through first selector 114 and subsequent dialed digits set up the connection through other selectors (not shown).

When an idle line finder 112 is connected to coin station 110 through coin station line circuit 111, ground potential is applied to the S-lead at line finder 112. This ground potential is passed through coin trunk 113 to first selector 114 to permit trunk 113 to return initial coinage deposit if the call is terminated without dialing. Once this connection has been established, line finger 112 removes ground potential from the S-lead. Switching network 120 then applies ground potential to the S-lead to hold coin trunk 113 operated which in turn holds line finder 112 operated. If coin station 110 should go on-hook, this condition is recognized by network 120 wherein the already established connection is taken down. Line finder 112 is not immediately released as the ground potential applied to lead S by coin trunk 113 holds the line finder operated, until a high potential coin disposal pulse is transmitted to coin station 110. Upon removal of the ground potential placed on lead S by coin trunk 113, line finder 112 is released for use with another coin station call.

Applique circuit 121, FIG. 1, allows the connection to be established between coin station 110 and first selector 114 over tip-ring and sleeve paths provided by dial pulse and coin ground detector 115. Dial pulse detector 115 then detects both the dial pulses of each dialed digit and the interval following the first three dialed digits. Dial pulse detector 115 repeats the dial pulses towards first selector 114 and to digit register 116 which counts the pulses and provides an output to decoder 118 indicating the particular dialed digit. After a digit has been registered by digit register 116 and transmitted to decoder 118, the digit interval detector in dial pulse detector 115 operates and clears digit register 116 to enable it to receive the dial pulses of the next dialed digit. The digit interval detector in dial pulse detector 115 also operates digit counter 117 which counts the number of digits dialed. Digit counter 117 provides one output indicating the number of digits dialed to decoder 118 and a second output to coin control 119 only after the third digit has been dialed.

Decoder 118 individually checks the first three dialed digits to determine if each digit is a part of a one- or three-digit free-call code. If decoder 118 determines that the first digit indicates a free call, the call is allowed to be completed, and an indication to this effect is sent to coin control 119 which causes applique circuit 121 to go to an idle state wherein applique circuit 121 only repeats dial pulsing toward network 120. If decoder 118 determines that the first digit is part of a valid three-digit code, it will check the second digit; otherwise it will not. Decoder 118 repeats the same procedure for the second and third digits except that it does not check for a fourth digit after the receipt of the third digit. If a valid three-digit code is detected, an indication to this effect is sent to coin control 119.

When coin control 119 receives the indication from digit counter 117 that three digits have been dialed, digit counter 117 causes applique circuit 121 to go to the idle state if a free-call indication has been received from decoder 118. Otherwise coin control 119 signals dial pulse and coin ground detector circuit 115 to check for the presence of coin ground on the T-lead. If coin ground is detected on the T-lead, an indication to this effect is returned to coin control 119 which causes applique circuit 121 to go to the idle state. If coin ground is not detected on the T-lead, coin control 119 causes the existing connection through switching network 120 to be taken down by opening the call supervision ground on lead S and a recorded announcement indicating the lack of coinage deposit to be connected to coin station 110.

DETAILED DESCRIPTION

1. Dial Pulse and Coin Ground Detector — FIG. 2.

To place a call a party at coin station 110 in FIG. 1 places the set in the off-hook condition, coin loop-start line circuit 111 selects an idle line finder 112 and dial tone is returned to the station by first selector 114. Coin trunk 113 in FIG. 2 applies ground potential to lead T, which is returned through the completed coin station loop (FIG. 7) to lead R. Ground appearing on lead R operates relay 2PLS over a path through break contacts 6CNT-4, CT-2, and 6CNT-1, inductor L2, diode D1, break contacts 6CNT-5 and the winding of relay 2PLS.

Figure 2:
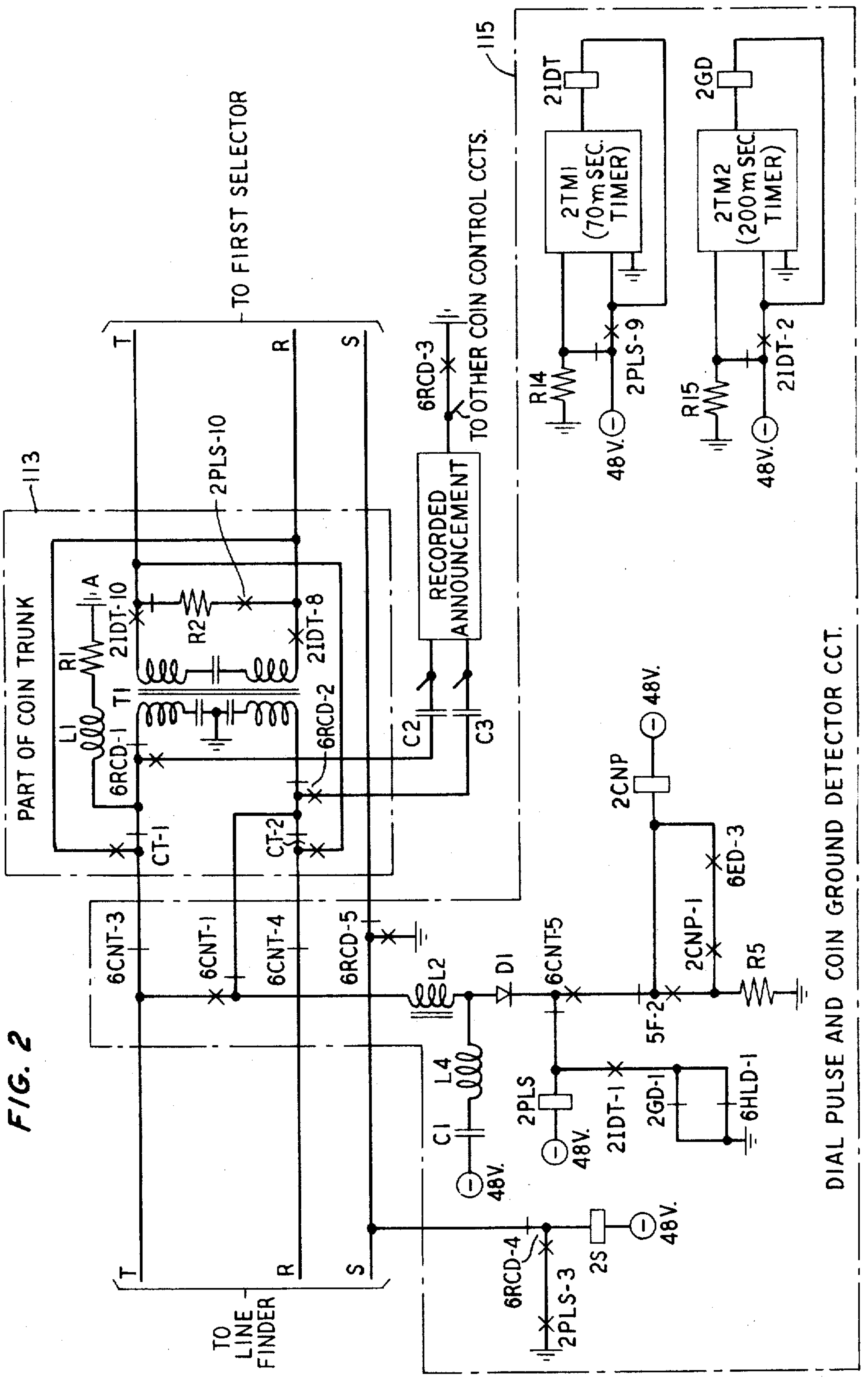
FIG. 2 is a schematic diagram of the dial pulse and coin ground detection circuits for modifying the coin trunk.
Figure 3:
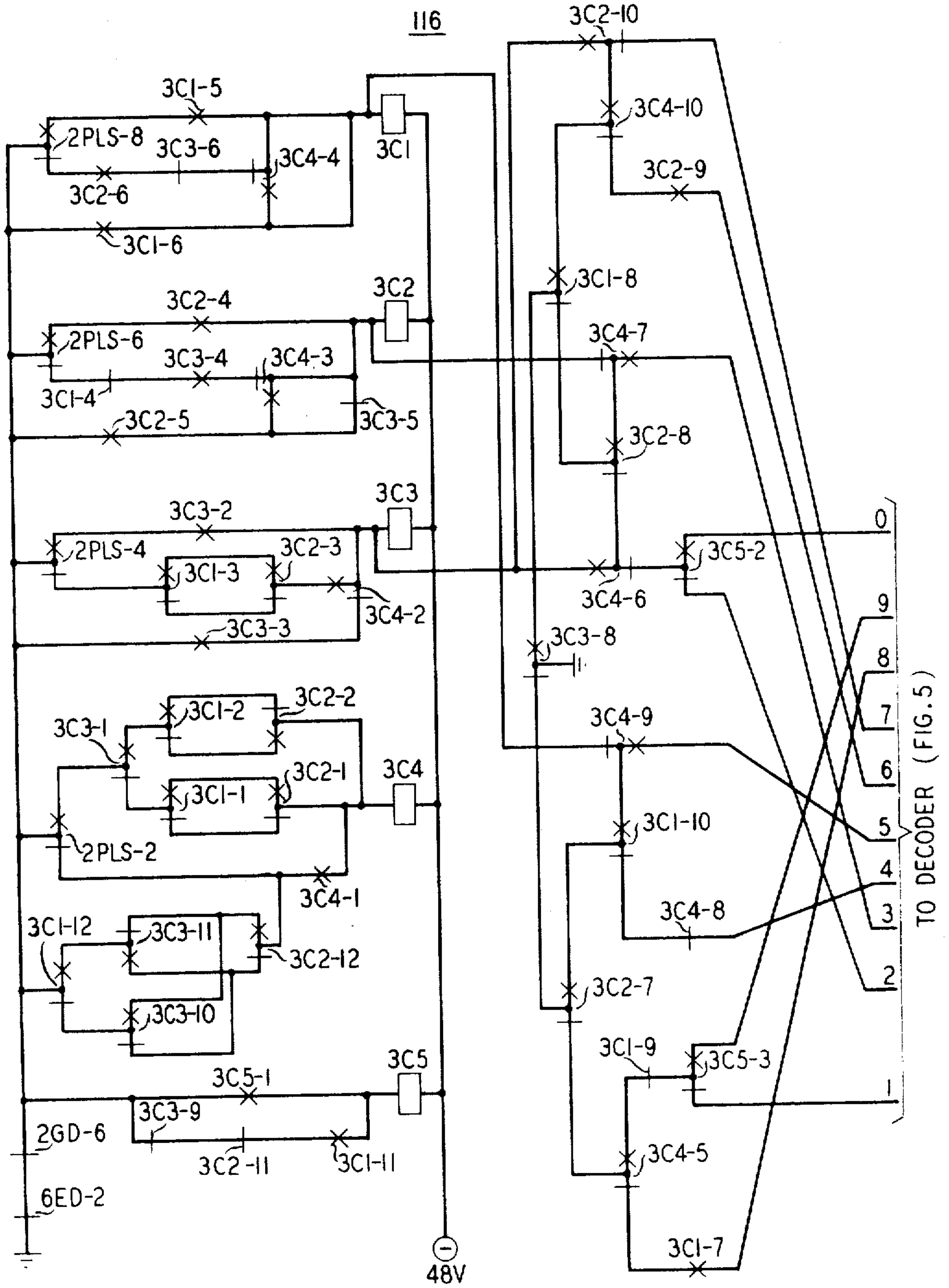
FIG. 3 is a schematic diagram of the digit register.
Figure 6:
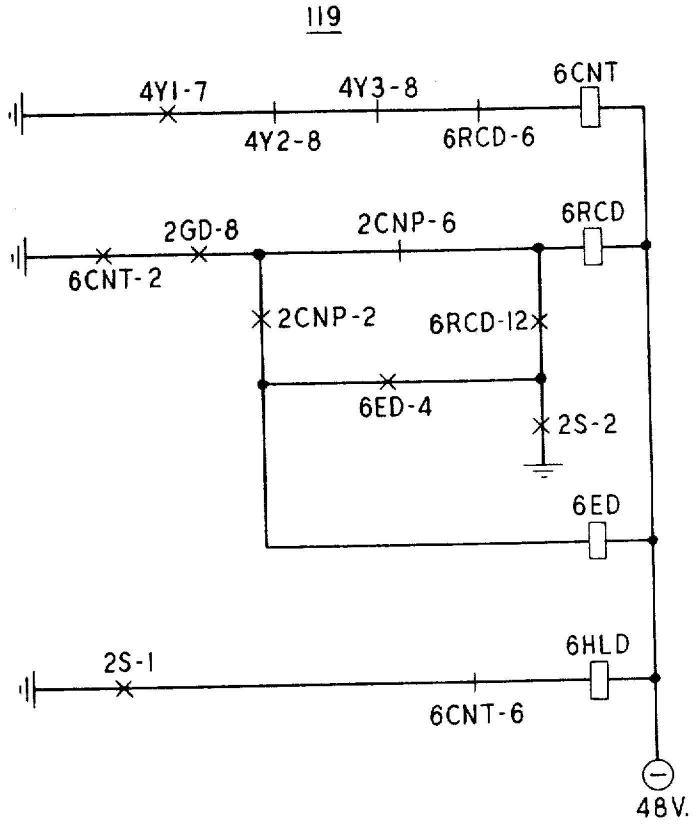
FIG. 6 is a schematic diagram of the coin control circuit.

In the ensuing description the initial number of each relay contact designation will usually be the same as the number of the figure in the drawing in which its winding appears. Thus, contact 6CNT-4 shown in FIG. 2 is controlled by its winding which appears in FIG. 6. Where no initial number is employed, the relay winding is not shown in detail.

The supervisory ground potential normally found on lead S operates sleeve relay 2S through break contact 6RCD-4. Make contacts 2S-4, 2S-3 and 2S-2 respectively activate digit counter 117 (FIG. 4), decoder 118 (FIG. 5) and coin control 119 (FIG. 6) to perform their respective functions (as will hereinafter be described) in determining whether the following onef or three-digit code dialed at coin station 110 represents a free-call code to be completed without coinage deposit. At the coin station, dial pulsing momentarily interrupts current flowing through the coin station loop; releasing and reoperating relay 2PLS for each dial pulse. Make contact 2PLS-10 in the trunk circuit repeats the dial pulsing toward first selector 114 by closing and opening the loop through break contact 2IDT-10, resistor R2, and make contact 2PLS-10, Current flows through this loop in the same manner as was priorly discussed for the coin station loop.

Before the first digit is dialed, the operation of make contacts 2PLS-9 starts timer 2TM1, and 70 ms later relay 2IDT operates. Make contact 2IDT-2 starts timer 2TM2 and 200 ms later relay 2GD operates. With the first coin station loop current interruption relay 2PLS releases, resetting and restarting timer 2TM1. Resetting timer 2TM1 releases relay 2IDT, which in turn resets timer 2TM2, releasing relay 2GD. Subsequent release and reoperate cycles of relay 2PLS, as the dial unwinds for a single dialed digit, do not exceed the 70 ms interval necessary to reoperate timer 2TM1. Seventy milliseconds after the end of each dialed digit, timer 2TM1 again operates relay 2IDT, and 200 ms thereafter timer 2TM2 operates relay 2GD. Between the operations of relay 2IDT and 2GD, all other circuits in applique circuit 121 collectively function to determine if the previously dialed digit is part of a coin-free dial code (as will hereinafter be described) and prepare to receive the next dialed digit, permit the call to be completed, or connect the coin station to a recorded announcement, as the situation requires.

Figure 5:
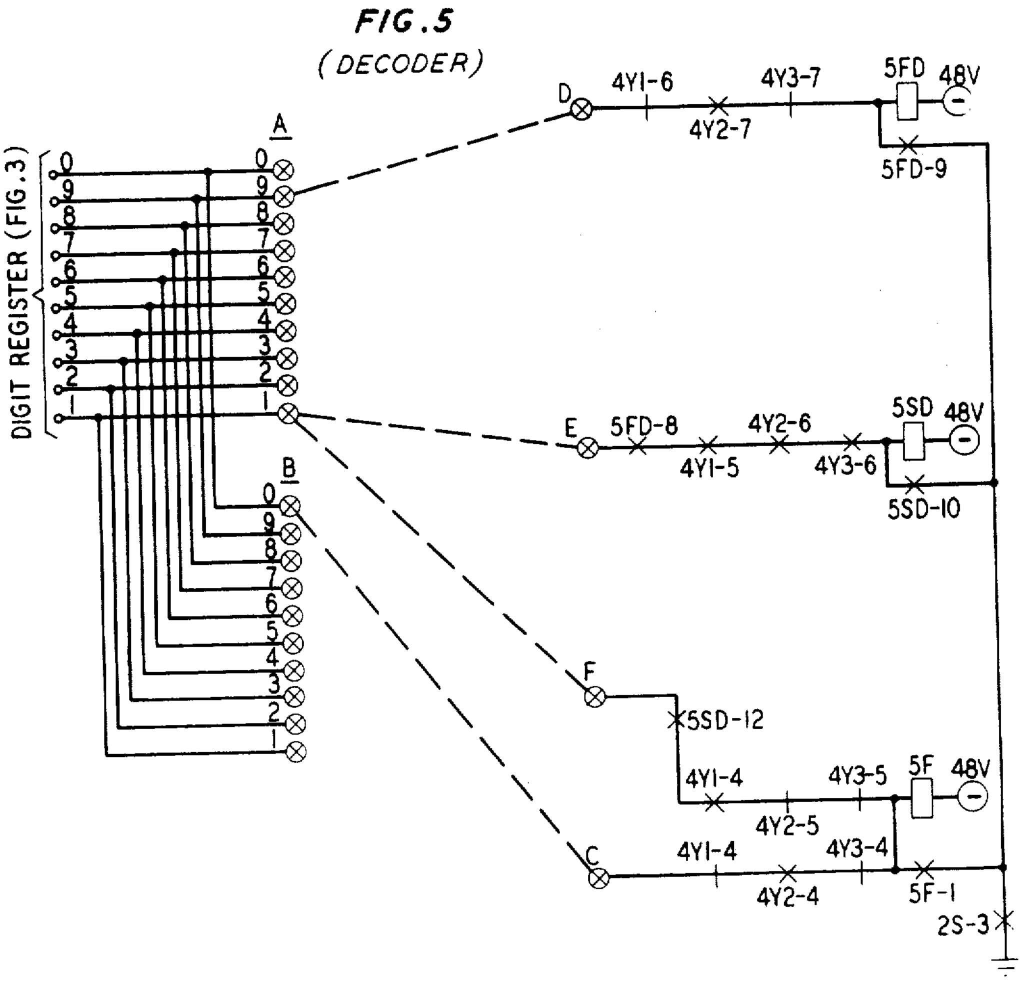
FIG. 5 is a schematic diagram of the decoder circuit.

After three digits have been dialed and the decoder 118 in FIG. 5, has determined that a coin-free code has not been dialed and that a coin test must be made, coin test relay 6CNT in coin control (FIG. 6) is operated. Break contacts 6CNT-3 and 6CNT-4 isolate both dial pulsing ground A in the coin trunk (FIG. 2) and the T- and R-lead paths toward first selector 114 from the coin station loop. The removal of ground A from lead T causes relay 7A to release, reconnecting coin ground to coin deposit make contact 7-1. Coin present relay 2CNP is connected to lead T over a path through make contact 6CNT-1, inductor L2, diode D1, make contact 6CNT-5, break contact 5F-2, and the winding of relay 2CNP. If coinage equal to or exceeding the local initial rate has been deposited at the coin station (FIG. 7), coin ground is present on lead T and relay 2CNP is operated. Conversely relay 2CNP is not operated if proper coinage has not been deposited. Details of the function of relay 2CNP, the recorded announcement, and the function of dial pulse and coin ground detector circuit 115 upon hang-up are discussed further on.

2. Digit Register — FIG. 3

Prior to each digit dialed relay 2GD is operated (as priorly described) and break contact 2GD-6 opens the ground potential operate and holding path of relays 3C1 through 3C5, releasing any operated relays. When the dial is drawn and released relay 2GD is released (as priorly described) closing the operate path to relays 3C1 through 3C5. As relay 2PLS releases and reoperates for each dial pulse of a dialed digit, the digit register is pulsed by transfer contacts 2PLS-2, 2PLS-4, 2PLS-6, and 2PLS-8. The dial pulses are registered by relays 3C1 through 3C5 and the particular numbered output lead corresponding to the digit dialed has ground potential applied to it. Assume the number 2 was dialed. The first release and reoperate cycle of relay 2PLS leaves relay 3C4 operated over a path of normal break contacts 6ED-2 and 2GD-6, make contacts 2PLS-2, break contacts 3C3-1, 3C1-1, and 3C2-1, and the winding of relay 3C4. Upon the release of relay 2PLS for the second dial pulse, relay 3C4 remains operated over a path through normal break contacts 6ED-2 and 2GD-6, break contact 2PLS-2, make contact 3C4-1, and the winding of relay 3C4. In addition, relay 3C3 operates over a path through normal break contacts 6ED-2 and 2GD-6, break contacts 2PLS-4, 3C1-3, and 3C2-3, make contact 3C4-2, and the winding of relay 3C3. Upon reoperation of relay 2PLS at the end of the second dial pulse relay 3C4 is released at break contact 3C3-1, but relay 3C3 remains operated through make contact 3C3-2, and the now operated make contact 2PLS-4. Thus, at the end of dialing the number 2 only relay 3C3 remains operated and ground potential is applied only to output lead 2 over the path of make contact 3C3-8, and break contacts 3C1-8, 3C2-8, 3C4-6, and 3C5-2.

At the end of three dialed digits, relay 6ED operates (as discussed hereinafter), and break contact 6ED-2 opens the ground potential path to release operated ones of relays 3C1 through 3C5.

3. Digit Counter — FIG. 4

When coin trunk 113 is seized, timer 2TM1 operates relay 2IDT as priorly described. Relay IDT is released as each digit is being pulsed and reoperates at the end of each dialed digit. Upon the initial operation of relay 2IDT, before any digits are dialed, relay 4Y3 operates over the path through make contact 2S-4, break contact 6ED-1, make contact 2IDT-12, break contacts 4Y1-1 and 4Y2-1, and the winding of relay 4Y3. As the first digit is being pulsed and relay 2IDT is released, relay 4Y3 remains operated over the path through make contact 2S-4, break contacts 6ED-1, and 2IDT-12, make contact 4Y3-1, and the winding of relay 4Y3. At the same time, relay 4Y2 operates over the portion of the path through break contact 2IDT-6, make contact 4Y3-3, break contact 4Y1-2, and winding of relay 4Y2. When relay 2IDT reoperates at the end of the first digit, relay 4Y2 remains operated over the path through make contacts 2IDT-6 and 4Y2-2 but relay 4Y3 releases as the reoperation of relay 2IDT opened the hold path through break contact 2IDT-12 and the prior operate path of relay 4Y3 is now opened at break contact 4Y2-1. Thus, at the end of the first dialed digit only relay 4Y-2 is operated. In a similar manner, at the end of the second dialed digit, relays 4Y-1, 4Y-2, and 4Y-3 remain operated, and, at the end of the third dialed digit only relay 4Y-1 remains operated. At the end of three dialed digits, relay 6ED is operated (as will hereinafter be discussed) releasing all Y-relays by opening their operating and holding path at break contact 6ED-1.

4. Decoder — FIG. 5

The 10 numbered output leads of the digit register (FIG. 3) and contacts of relays 4Y1, 4Y2, and 4Y3 in the digit counter (FIG. 4) drive the decoder. At the end of the first and third digits dialed, the decoder determines whether specifiable one- or three-digit codes indicating a free call have been dialed.

Selective one-digit coin-free call codes such as "0" are programmed by making appropriate cross connections between the B-terminals and terminal C. For example, to provide coin-free access to an operator for parties dialing " 0", a cross connection is made from terminal B-O to terminal C. The party at a coin station goes off-hook, received dial tone without coinage deposit (as priorly discussed) and dials "0". The digit register (FIG. 3) counts the 10 dial pulses and applies ground potential to lead 0 and thus to terminal B-O. In addition the digit counter (FIG. 4) has only relay 4Y2 operated as priorly discussed. The ground potential on terminal B-O operates relay 5F, indicating a one-digit coin-free call code, over a path through the cross connection between terminals B-O and C, break contact 4Y1-4, make contact 4Y2-4, break contact 4Y3-4, and the winding of relay 5F. Relay 5F maintains itself operated over a path through make contacts 2S-3 and 5F-1 and the winding of relay 5F. In FIG. 2 relay 2CNP operates over a path through make contact 5F-2 and resistor R-5.

Figure 4:
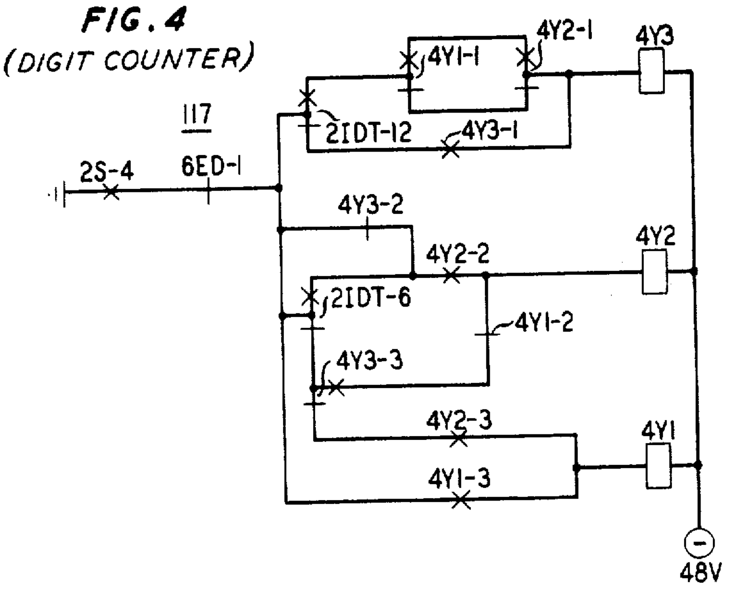
FIG. 4 is a schematic diagram of the digit counter.

Selected three-digit coin-free call codes (for emergency and operator services) are programmed by making appropriate cross connections between the A-terminals and terminals D, E, and F. For allowed first digits, cross connections are made to terminal D, for allowed second digits, cross connections are made to terminal E, and for allowed third digits cross connections are made to terminal F. For example, to provide service for the nationwide "911" emergency dial code, cross connections are made from terminals A-9 to D, A-1 to E, and A-1 to F. When the "9" digit is dialed, ground potential is applied to terminal A-9 by the digit register (FIG. 3) and only relay 4Y2 is operated by the digit counter (FIG. 4). Relay 5FD operates, indicating an allowed first digit, over a path through the cross connection between terminals A-9 and D, break contact 4Y1-6, make contact 4Y2-7, break contact 4Y3-7, and the winding of relay 5FD. Relay 5FD maintains itself operated over a path through make contacts 5FD-9 and 2S-3. The operation of relay 5FD permits the decoder to check the second digit dialed by priming a path to relay 5SD at make contact 5FD-8. If an allowed first digit has not been dialed, relay 5FD would not operate, the second digit would not be checked by the decoder, and (as will hereinafter be discussed) at the end of three dialed digits the coin station will be connected to a recorded announcement if proper coinage has not been detected by the coin ground detector (FIG. 2). When the first "1" digit is dialed, ground potential is found on terminal A-1 and relays 4Y1, 4Y2, and 4Y3 are all operated (as priorly described). Relay 5SD operates, indicating an allowed second digit, over a path through the cross connection between terminals A-1 and E, make contacts 5FD-8, 4Y1-5, 4Y2-6, and 4Y3-6, and the winding of relay 5SD. Relay 5SD maintains itself operated over a path through make contacts 5SD-10 and 2S-3. The operation of relay 5SD permits the decoder to check the third dialed digit by priming a path to relay 5F at make contact 5SD-12. If an allowed second digit has not been dialed, the third dialed digit will not be checked by the decoder. When the final "1" digit is dialed, ground potential is found on terminal A-1 and only relay 4Y1 is operated (as priorly described). Relay 5F operates, indicating an allowed third digit (and completion of a valid three-digit coin-free call code) over a path through the cross connection between terminals A-1 and F, make contacts 5SD-12 and 4Y1-4, break contacts 5Y2-5 and 5Y3-5, and the winding of relay 5F. Relay 5F maintains itself operated through make contacts 5F-1 and 2S-3. The cross connections for valid first, second, or third digits individually serve as OR logic functions, the outputs of which are one input to AND logic functions. The other two inputs to the AND logic function are a relay contact of the relay indicating a prior valid digit and the 4Y- relay contacts which indicate a predetermined count of the digit register. For example, for the second dialed digit, the OR function is the cross connection from the ten A terminals to terminal E (although only one cross connection is shown in this embodiment of the invention). The output of the OR function is terminal E, which is one input to the AND function. The second input to the AND function is make contact 5FD-8 which indicates a valid first digit, and the third input are make contacts 4Y1-5, 4Y2-6, and 4Y3-6 which indicate the second digit. If there is a signal on the first input in the form of ground on terminal E, and signals on the second and third inputs in the form of relays 5FD, 4Y1, 4Y2, and 4Y3 being operated, there is an output signal in the form of relay 5SD being operated.

When the call is terminated relay 2S in the dial pulse and coin ground detector circuit (FIG. 2) is released, opening the operating and holding path of relays 5F, 5FD, and 5SD at make contact 2S-3.

5. Coin Control Circuit — FIG. 6

At the end of the third dialed digit the coin control circuit permits the call to be completed if a one- or three-digit coin-free call code has been detected by the detector (FIG. 5), or a coin-free call code has not been detected but proper coinage deposit has been detected (as priorly described). If a coin-free call code has not been detected and coinage has not been deposited, the coin control circuit causes the coin station to be connected to a recorded announcement indicating the lack of coinage and causes the already established switching connection to be taken down. These functions of the coin control circuit are discussed in the above order.

As priorly described, when a one-digit coin-free call code has been detected, relay 5F in the decoder (FIG. 5) is operated. Relay 2CNP is in turn operated over a path through make contact 5F-2 and resistor R5. When the call is completed to the operator, relays 2S, 2PLS, 2CNP, 2IDT, and 2GD remain operated in FIG. 2. Also, relay 4Y-2 in the digit counter (FIG. 4) and relay 5F in the decoder (FIG. 5) remain operated (as priorly described). In this case, only relay 6HLD is operated in the coin control circuit over a path through make contact 2S-1 and break contact 6CNT-6. When the calling party goes on-hook ground is removed from leads (as priorly described) and relays 2PLS and 2S in FIG. 2 are released. Contact PLS-9 in turn releases relay 2IDT which in turn releases relay 2GD. Contact 2S-4 releases relay 4Y-2, contact 2S-3 releases relay 5F, contact 2S-1 releases relay 6HLD, contact 5F-2 releases relay 2CNP, contact 2GD-6 releases operated ones of relays 3C1 through 3C5, and the coin trunk applique circuit is in the idle state.

When a three-digit coin-free call code has been dialed, the coin trunk applique circuit is to be returned to an idle state and the call is allowed to be completed. This is performed in the following sequence. At the end of the three digits, relay 5F in the decoder and relay 4Y1 in the digit counter are operated (as priorly described). Relay 2S, 2PLS, 2IDT and 2GD remain operated in the dial pulse and coin ground detector circuit. Relay 2CNP is operated through make contact 5F-2 and resistor R-5. Relay 6CNT in the coin control circuit is operated over the path through make contact 4Y1-7, break contacts 4Y2-8, 4Y3-8, and 6RCD-6, and the coil of relay 6CNT. Relay 6HLD is released at break contact 6CNT-6. Relay 6CNT operates at about the same time as relay 2IDT, but break contact 6CNT-5 does not release relay 2PLS. Relay 2PLS is held operated over a path through make contact 2IDT-1 and break contact 2GD-1. The operation of relay 2GD operates relay 6ED over a path through make contacts 6CNT-2, 2GD-8, and 2CNP-2 and releases operated ones of relays 3C-1 through 3C-5 by opening their holding path at break contact 2GD-6. The release of relay 6ED in turn opens the holding path of relay 4Y1 at break contact 6ED-1. The release of relay 4Y1 in turn opens the operate path of relay 6CNT at make contact 4Y1-7. The release of relay 6CNT also reconnects relay 2PLS (FIG. 1) to the R-lead through break contact 6CNT-5. Thus, when the three-digit coin-free call is completed, relays 2S, 2PLS, 2IDT, 2GD, and 2CNP remain operated in FIG. 2. Relay 6ED remains operated in the coin control circuit over make contacts 6ED-4 and 2S-2, and relay 5FD, 5SD, and 5F remain operated in the decoder through make contact 2S-3. When the party at coin station 110 goes on-hook, the opening of the coin station loop removes ground potential from the R-lead releasing relay 2PLS. Transfer contact 2PLS-9 releases relay 2IDT which in turn releases 2GD. This leaves only relay 2CNP operated in dial pulse and coin ground detector circuit at this moment. Network 120 removes ground potential from lead S, which releases relay 2S. The release of relay 2S in turn releases relay 5FD, 5SD, and 5F in the decoder by opening make contact 2S-3, and relay 6ED in the coin control circuit by opening make contact 2S-2. This leaves all relays in the decoder and coin control circuits unoperated. The release of relay 5F finally releases relay 2CNP in FIG. 2 and the coin trunk applique circuit is idle.

When three digits have been dialed and a coin-free call code is not detected, relays 2PLS, 2S, 2IDT, and 2GD are operated (as previously described) in the dial pulse and coin ground detector circuit. Some combination of relays 3C1 through 3C5 remain operated in the digit register, relay 4Y1 remains operated in the digit counter, and relay 5FD or relays 5FD and 5SD remain operated in the decoder (all as previously described). As a coin-free code was not dialed, relay 5F in the decoder is not operated, and a coin test must be made on calling coin station 110. As only relay 4Y1 is operated in the digit counter, relay 6CNT is operated in the coin control circuit over a path through make contact 4Y1-7 and break contacts 4Y2-8, 4Y3-8 and 6RCD-6. Break contacts 6CNT-3 and 6CNT-4 in FIG. 2 open leads T and R towards the first selector, and transfer contacts 6CNT-1 and 6CNT-5 connect coin present relay 2CNP to the T-lead to detect for coin ground over a path through break contact 5F-2, make contact 6CNT-5, diode D1, inductor L-2, and make contact 6CNT-1 to the T-lead. If coin ground CG is present on lead T, relay 2CNP is operated. When relay 2GD operates (as previously described) the operate path to relay 6ED (FIG. 6) is completed through make contacts 6CNT-2, 2GD-8, and 2CNP-2. Relay 6ED maintains itself operated over a path through make contacts 6ED-4 and 2S-2. The operation of relay 2GD releases operated ones of relays 3C1 through 3C5 in the digit register by opening their holding path at break contact 2GD-6. Relay 4Y1 in the digit counter is released when its operate path is opened at break contact 6ED-1. The release of relay 4Y1 in turn releases relay 6CNT by opening contact 4Y1-7 but relay 2CNP in FIG. 2 is held operated over a path through make contacts 2CNP-1, 6ED-3, and resistor R5. The call is allowed to be completed, leaving relays 2S, 2PLS, 2IDT, 2GD, and 2CNP operated in FIG. 2, leaving operated ones of relays 5FD and 5SD operated in the decoder and relay 6ED operated in the control circuit. When the connection is terminated, all the relays are released in the sequence previously described when a three-digit coin-free call is terminated.

If in the prior case proper coinage had not been deposited, coin ground is not present on lead T in FIG. 2 and relay 2CNP would not be operated. Instead of relay 6ED being operated through make contact 2CNP-2, relay 6RCD is operated through break contact 2CNP-6 and make contacts 6CNT-2 and 2GD-8. Relay 6RCD then maintains itself operated through make contacts 6RCD-12 and 2S-2. Relay 6CNT is then released as its operating path is opened at 6RCD-6. At this time in the operational sequence of applique circuit 121 relays remain operated in all the individual circuits except for the digit register in which the operate path of relays 3C1 through 3C5 is opened at break contact 2GD-6.

Applique circuit 121 now functions to connect the recorded announcement indicating the lack of proper coinage to the coin station. In the dial pulse and coin ground detection circuit transfer contact 6RCD-5 breaks leads toward coin trunk 113 and first selector 114. In response thereto the already established connection through network 120 is taken down. Transfer contact 6RCD-5 also applies ground on lead S toward the coin station to hold line finder 112 operated for the period that the recorded announcement is transmitted to the coin station. Transfer contact 6RCD-4 removes the 2S relay from the S-lead, but holds it operated over the path through make contacts 6RCD-4 and 2PLS-3. The recorded announcement is connected to the T- and R-leads towards the coin station by transfer contacts 6RCD-1 and 6RCD-2, which also break the T- and R-path toward the first selector. The recorded announcement is started by make contact 6RCD-3. When the coin station is placed in the on-hook condition following the recorded announcement, relay 2PLS is released as its operating ground in the coin trunk (FIG. 2) is removed by the opening of the coin station loop. The release of relay 2PLS releases relay 2S by opening make contact 2PLS-3. The release of relay 2PLS also releases relay 2IDT and in turn relay 2GD (as previously described) leaving the dial pulse and coin ground detector circuit idle. The release of relay 2S releases all operated relays in the digit counter (FIG. 4), the decoder (FIG. 5), and the coin control circuit (FIG. 6) and coin trunk applique circuit 121 is in its idle state.

Thus the coin trunk applique circuits of my invention provide coin-free telephone service for specifiable one- or three-digit codes. Fraudulent or frivolous use of the coin station is prevented by registering the first three digits dialed, determining if a coin-free code has been dialed, and checking for coinage deposit when a coin-free code has not been dialed. Calls are permitted to be completed if a coin-free call code is detected or a coin-free number has not been dialed but proper coinage is detected. When a coin-free code is not registered and proper coinage is not detected, the network connection is torn down and a recorded announcement connected to the coin station.

It is apparent that various modifications may be made without departing from the spirit and scope of my invention. Thus, for example, my invention may be used to register and detect dial codes of any number of digits.

What is claimed is:

1. An arrangement for providing coin-free telephone service for specifiable digit codes to dial-tone-first coin telephones associated with the network of a serially progressive switching system, comprising means for applying a sequence of call signals representing dialed digits to the network of said switching system, means operative simultaneously with said applying means for registering said sequence of digits, means connected to said registering means for checking a digit of said sequence to determine if it is a valid digit of one of said specifiable digit codes, means responsive to said checking means determining said valid digit for permitting said checking means to check the next generated digit, and means responsive to said checking means determining that a valid one of said specifiable codes has not been generated for disconnecting said calling coin telephone from the switching network of said system.

2. The arrangement according to claim 1, wherein said permitting means comprises means operative a predetermined interval after said digit has been registered for clearing said digit registering means to permit said digit registering means to register the next dialed digit.

3. The arrangement according to claim 1, further comprising means connected to said registering means for counting the number of digits dialed, said checking means is responsive to the appearance of a predetermined digit in said digit registering means and a predetermined count of said digit counter means to store an indication of a valid digit.

4. An arrangement for providing coin-free telephone service for specifiable digit codes to dial-tone-first coin telephones associated with the switching network of a serially progressive switching system comprising means for applying a sequence of call signals representing dialed digits to the network of said switching system, means operative simultaneously with said applying means for registering the *n*th digit of said sequence of digits, means operative at a predetermined interval after said *n*th digit has been registered for clearing said registering means to permit said registering means to register a subsequent digit of said sequence of digits, means responsive to said clearing means for counting the number of digits dialed when said *n*th digit has been registered, means responsive to said registering means and said digit counting means for checking said *n*th digit to determine if it is a valid *n*th digit of one of said specifiable dial codes, and means responsive to said checking means having failed to determine said valid *n*th digit for connecting said calling coin telephone to a recorded announcement and for taking down said established connection through said network.

5. The arrangement according to claim 4, wherein said registering means includes a plurality of output leads and means for energizing predetermined ones of said leads corresponding to respective values of said *n*th digit, wherein said digit counting means has a plurality of output terminals, one of said terminals being energized to indicate a particular digit count, said checking means including a plurality of OR logic circuits and a plurality of AND logic circuits, one each of said circuit being associated with a respective one of the output terminals of said digit counting means, means for connecting the output terminals of said registering means representing the *n*th digit of each of said specifiable digit codes to the inputs of the *n*th digit one of said OR logic circuits, and means for connecting the output terminals of the *n*th digit one of said OR circuits and the *n*th digit output lead of said digit counting means to the input of the *n*th digit one of said AND circuits.

6. An arrangement for providing coin-free telephone service for specifiable digit codes to dial-tone-first coin telephones having means for generating a sequence of call signals representing dialed digits, said arrangement comprising means for applying said digits to a network of a serially progressive switching system, means for registering a sequence of digits simultaneously as applied to the switching network, means connected to said registering means for counting the number of digits dialed, means connected to said registering means and said counting means for checking a digit of the sequence to determine if it is a valid digit of one of the specifiable digit codes, means responsive to said checking means determining said valid digit for permitting said checking means to check the next generated digit, means responsive to said checking means for indicating that a valid one of said specifiable codes has been applied to the network, and coin test means including means alternatively responsive to said indicating means and the presence of a coin at the coin telephone.

7. An arrangement in accordance with claim 6 further comprising means responsive to said coin test means for disabling said registering means and said counting means.

8. An arrangement in accordance with claim 7 further comprising recorded announcement means and means responsive to said coin test means for connecting said recorded announcement means to the coin telephone.

9. In a telephone system wherein circuitry is provided for detecting the presence of coins at a coin telephone and wherein coin-free telephone service is provided for the coin telephone station on the application of specifiable dialed digits to a network of a serially progressive switching system, the improvement comprising means for registering a sequence of digits simultaneously as applied to the switching network, means connected to said registering means for counting the number of digits dialed, means responsive to said registering means and said counting means for determining if a valid one of said specifiable codes has been applied, and means responsive to said determining means having determined that other than a valid one of said specifiable codes has been applied to said switching network to operate said circuitry for detecting the presence of coins at a coin station in the absence of any coins at the coin station.

10. In a telephone system, the improvement in accordance with claim 9 further comprising means responsive to said determining means determining a valid one of said specifiable codes for disabling said registering means and said counting means.

11. In a telephone system, the improvement in accordance with claim 9 wherein said determining means includes means for checking a digit of each sequence to determine if it is a valid digit of one of the specifiable codes and means responsive to said checking means for permitting said determining means to check the next applied digit.

* * * * *